Patented June 9, 1942

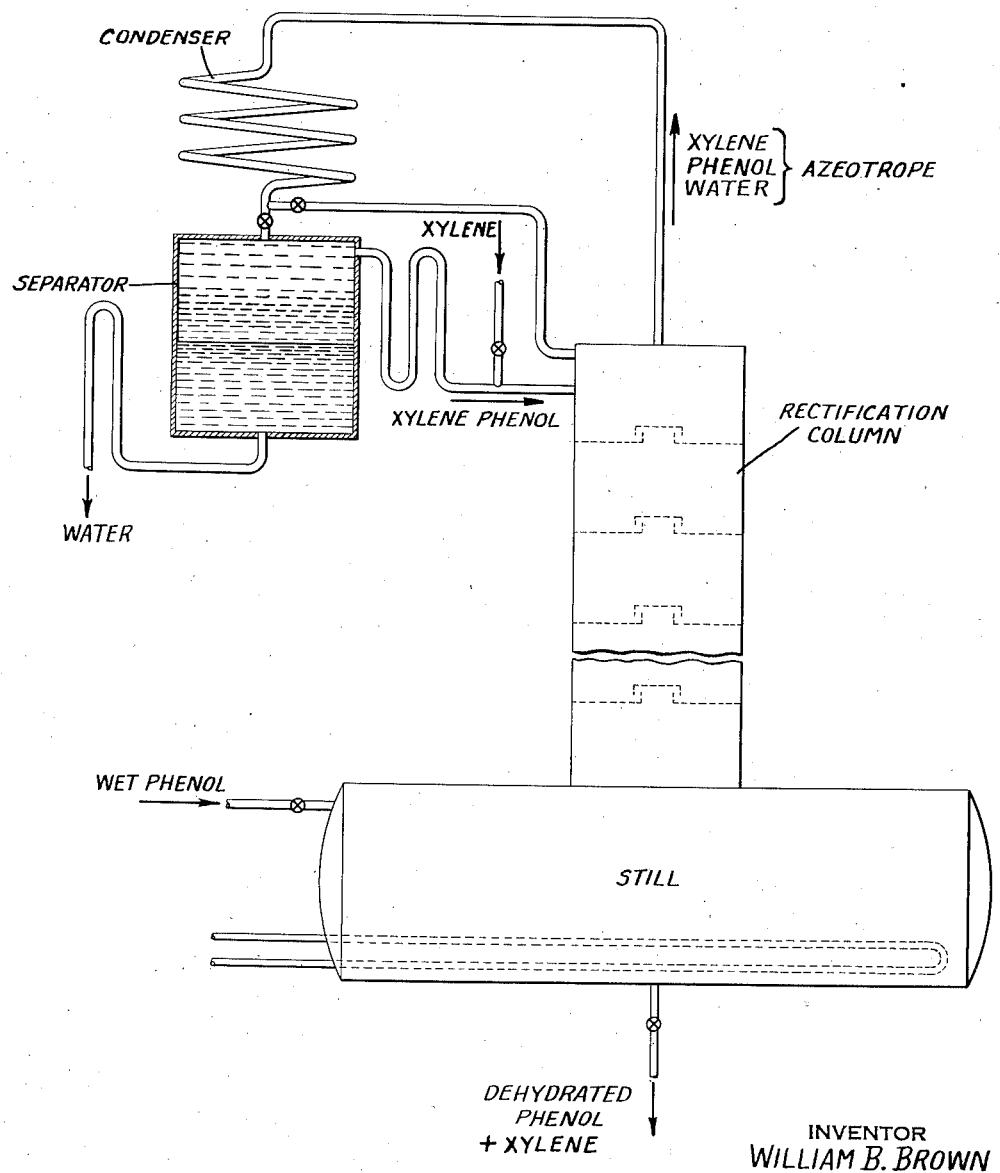

2,286,056

UNITED STATES PATENT OFFICE 2,286,056

DEHYDRATION OF PHENOLS

William Benno Brown, Westmont, N. J., assignor, by mesne assignments, to Allied Chemical & Dye Corporation, a corporation of New York Application December 5, 1940, Serial No. 368,615

8 Claims. (Cl. 202—42)

This invention relates to the dehydration of phenols including synthetic phenols and natural phenols, the latter being commonly termed "tar acids." As is well known, natural phenols are obtained from tars and oils produced in the low and high temperature carbonization and gasification of coal and in the production of water gas.

The use of azeotropic distillation to dehydrate aqueous solutions of organic compounds is well recognized. For example, aqueous alcoholic solutions are dehydrated by subjecting the aqueous solution to azeotropic distillation utilizing benzol as the azeotropic agent. It has also been proposed to separate phenol and diphenyl ether from a mixture containing these constituents, chlorbenzene and water by azeotropic distillation, utilizing a further amount of chlorbenzene as the azeotropic agent, distilling off the chlorbenzene and water, leaving a mixture of phenol and diphenyl ether in the still (United States Patent 2,051,782, granted August 18, 1936).

It is an object of this invention to provide a process for dehydrating wet phenols, including phenol, cresol, xylenol and other hydroxy aromatic compounds by subjecting the wet phenols to azeotropic distillation in the presence of an azeotropic agent which permits the rapid removal of the water, the facile separation of the phenol from the agent, results in a relatively small loss of phenol in the condensed water, and, as compared with the use of other azeotropic agents, requires the use of a smaller quantity of azeotropic agent to effect the dehydration. Other objects and advantages of this invention will appear from the following detailed description thereof.

I have discovered that the dehydration of wet phenols can readily and efficiently be accomplished by subjecting the wet phenols to distillation in the presence of xylene as the azeotropic agent. The amount of xylene required for dehydration depends on the distillation equipment used and the water content of the phenol. In dehydrating wet phenol containing 20% water and 80% phenol without return of xylene to the column or still, at least 62% xylene, based on the weight of the dry phenol, should be added to the wet phenol. When using distillation equipment involving a still, fractionating column, separator for separating the xylene phenol mixture from the water and return line for returning the xylene phenol mixture to the column, as shown in the accompanying drawing, sufficient xylene should be present to fill the separator and to maintain a vapor concentration in the column of at least 1 volume of xylene vapor for every 3½ volumes of water vapor, or, to express the relationship by weight, at least 1.7 parts by weight of xylene for every 1 part by weight of water. In dehydrating a wet phenol containing 20% water in such equipment the use of 8% or more of xylene based on the weight of the dry phenol was found to give excellent results.

Xylene, I have found, permits the rapid removal of water from the wet phenols. Hence, the time of distillation to effect substantially complete dehydration is relatively short, thereby materially reducing the cost of the distillation operation as compared with the use of other azeotropic agents. Furthermore, the use of xylene results in a relatively small loss of phenols from the wet phenols undergoing distillation. Moreover, the xylene can readily be removed from the dry phenols by distillation.

The process of this invention may be practiced by adding the xylene in the liquid phase to the wet phenols, distilling, preferably in a column still, condensing the vapors, permitting the condensate to stratify into a xylene-phenolic layer and an aqueous layer, withdrawing the latter layer and returning the xylene-phenolic mixture to the column, and continuing the operation until the phenols have been dehydrated.

The following is an example of a preferred embodiment of the dehydration of wet phenol ($C_6H_5OH$) by my invention; it will be understood the invention is not limited to this example and includes the dehydration of other phenols.

A charge of 9200 gallons of crude synthetic phenol containing 20% water was introduced into a fractionating still equipped with a packed column. 800 gallons of xylene were also introduced into the still. The mixture was distilled at atmospheric pressure. The vapors were condensed, the condensate led to a separator where the xylene-phenolic layer was separated from the water and returned to the still, while the water, which may be extracted with benzol to remove the small amount (about 0.5%) of phenol it contains, was discarded. This operation required about 20 hours to dehydrate the wet phenol. The crude dry phenol was then distilled under vacuum of 27 inches of mercury to separate the dry phenol from the xylene. In this distillation the following cuts were taken: (1) xylene containing a small amount of phenol, which may be reused as the azeotropic agent in distilling a further batch of wet phenol; (2) the refined phenol; and (3) the residue.

The xylene used as the azeotropic agent may be the commercially obtainable nitration grade, boiling within the range of 137.2 to 140.2° C. and constituted substantially entirely of meta and para xylene; the commercially obtainable industrial grade which generally boils within the range of 137° to 142° C. and is constituted chiefly of meta and para xylene; meta, para or ortho xylene, or any desired mixture of those xylenes. The expression "xylene" as used in the claims is intended to include mixtures of two or three of the xylenes, as well as the individual xylenes.

Since certain changes may be made in carrying out the above process without departing from the scope of the invention, it is intended that all matter contained in the above description shall be interpreted as illustrative and not in a limiting sense.

What is claimed is:

1. The process of dehydrating wet phenols which comprises distilling the wet phenols in the presence of xylene in an amount sufficient to form an azeotropic mixture with the phenol and water so as to effect removal of water from the phenols.

2. The process of dehydrating wet phenols containing about 20% water which comprises distilling the wet phenols in the presence of at least 8% xylene based on the weight of the dry phenols as the azeotropic agent to effect removal of water from the phenols.

3. The process of dehydrating wet phenols which comprises distilling the wet phenols in the presence of xylene in an amount sufficient to form an azeotrope with the phenol and water, condensing the vapors to produce an aqueous mixture containing xylene and phenol, separating the phenol-xylene components from the water, returning the xylene-phenol components to the still, and continuing the said distillation until the water has been substantially completely removed from the phenols.

4. The process of dehydrating wet phenols containing about 20% water which comprises distilling the wet phenols in the presence of at least 8% xylene based on the weight of the dry phenols as the azeotropic agent, condensing the vapors to produce an aqueous mixture containing xylene and phenol, separating the phenol-xylene components from the water, returning the xylene-phenol components to the still, and continuing the said distillation until the water has been substantially completely removed from the phenols.

5. The process of dehydrating wet phenol which comprises distilling the wet phenol in a column still, adding xylene to the column in an amount sufficient to produce an azeotropic mixture of xylene, water and phenol, condensing the azeotropic mixture, separating the condensate into a water layer and a phenol-xylene layer, returning the phenol-xylene layer to the column and continuing the said distillation until the phenol has been substantially completely dehydrated.

6. The process of dehydrating wet phenol containing about 20% water which comprises distilling the wet phenol in a column still, adding at least about 8% xylene based on the weight of the dry phenol to the column to produce an azeotropic mixture of xylene, water and phenol, condensing the azeotropic mixture, separating the condensate into a water layer and a phenol-xylene layer, returning the phenol-xylene layer to the column and continuing the said distillation until the phenol has been substantially completely dehydrated.

7. The process of dehydrating wet phenols which comprises distilling the wet phenols in a column still, equipped with a condenser and separator, in the presence of xylene in amount sufficient to fill the separator and maintain a vapor concentration in the column of at least 1 volume of xylene vapor for every 3½ volumes of water vapor, condensing in said condenser the azeotropic mixture of xylene, water and phenol leaving the column, separating in said separator the condensate into a water layer and a phenol-xylene layer, returning the phenol-xylene layer to the column, and continuing the said distillation until the phenols have been substantially completely dehydrated.

8. The process of dehydrating wet phenol which comprises distilling the wet phenol in a column still, equipped with a condenser and separator, in the presence of at least 1.7 parts by weight of xylene for every part by weight of water, condensing in said condenser the azeotropic mixture of xylene, water and phenol leaving the column, separating in said separator the condensate into a water layer and a phenol-xylene layer, returning the phenol-xylene layer to the column, and continuing the said distillation until the phenol has been substantially completely dehydrated.

WILLIAM B. BROWN.